US007764607B2

United States Patent
Ohno et al.

(10) Patent No.: US 7,764,607 B2
(45) Date of Patent: Jul. 27, 2010

(54) METHOD AND SYSTEM FOR CONNECTION CONTROL

(75) Inventors: Tadayuki Ohno, Tokyo (JP); Tomoki Murakami, Tokyo (JP); Hiroshi Kurihara, Tokyo (JP)

(73) Assignee: NEC Corporation, Tokyo (JP)

( * ) Notice: Subject to any disclaimer, the term of this patent is extended or adjusted under 35 U.S.C. 154(b) by 572 days.

(21) Appl. No.: 11/790,202

(22) Filed: Apr. 24, 2007

(65) Prior Publication Data

US 2007/0248011 A1 Oct. 25, 2007

(30) Foreign Application Priority Data

Apr. 25, 2006 (JP) .............................. 2006-120427

(51) Int. Cl.
*H04L 12/26* (2006.01)
(52) U.S. Cl. ...................................... 370/230
(58) Field of Classification Search .................. None
See application file for complete search history.

(56) References Cited

U.S. PATENT DOCUMENTS

| 7,068,769 B1 * | 6/2006 | Weaver et al. ............ 379/201.1 |
| 7,233,589 B2 * | 6/2007 | Tanigawa et al. ............ 370/352 |
| 7,382,868 B2 * | 6/2008 | Moore et al. ........... 379/114.01 |
| 7,583,685 B2 * | 9/2009 | Ajitomi et al. .............. 370/401 |

FOREIGN PATENT DOCUMENTS

| JP | 2004-280229 | 10/2004 |
| JP | 2006-74133 | 3/2006 |

OTHER PUBLICATIONS

Radvision, SIP Server Technical Overview, 58 pages, Apr. 2004.*

* cited by examiner

*Primary Examiner*—Frank Duong
(74) *Attorney, Agent, or Firm*—McGinn IP Law Group, PLLC

(57) ABSTRACT

A connection control method is achieved by receiving from a first terminal, a call request for a communication with a second terminal to notify the call request from a connection control server to an application server; and executing at least a program to receive the call request from the connection control server, to request a connection state data of the second terminal to a storage server in response to the received call request. A connection control instruction for the first and second terminals is issued to the connection control server when there is no connection state data of the second terminal in the storage server or the second terminal in a free state. A connection control between the first and second terminals is performed by the connection control server in response to the connection control instruction; and the connection state data of each of the first and second terminals is stored in the storage server when the connection state between the first and second terminals is changed.

21 Claims, 13 Drawing Sheets

METHOD AND SYSTEM FOR CONNECTION CONTROL

BACKGROUND OF THE INVENTION

1. Field of the Invention

The present invention relates to a connection control system and more particularly relates to a connection control system for managing a data indicating a connection state of a communication terminal.

2. Description of Related Art

In association with the improvement of the Internet technique in recent years and the popularization of a mobile phone, an IP telephone and the like, a communication service has been diversified and enriched. As one example of the service, there is a presence service in which the state of a user is managed by a presence server, and such a state data (presence data) is provided to a different user, as disclosed in to Japanese Laid Open Patent Application (JP-P2004-280229A). In the presence service, a first user operates a terminal to input a presence data such as a presence state, an absence state, an out-of-office state and a meeting state, and the presence data is transmitted to a presence server and registered on it. Thus, a second user can refer to it. Consequently, the second user can recognize the presence state of the first user and take various actions such as a visit appointment and calling in accordance with the recognition.

However, in the presence service in the conventional example, the user himself must operate the terminal to input and register the presence data. Thus, if the user forgets the registration of the presence data, its effect cannot be attained. Also, for the actions such as a calling state and a short absence, the presence data are not registered by the user himself in many cases. In such a case, the effect of the presence service is not attained. For example, even if the calling is performed with reference to the presence data, a partner cannot naturally respond to it if he is in the calling state.

SUMMARY OF THE INVENTION

It is therefore an object of the present invention to improve the above-mentioned inconveniences in the conventional technique.

Also, another object of the present invention is to provide a technique in which a situation of a user is automatically registered when a communication terminal is used and various communication services are provided by using the registration data.

In an aspect of the present invention, a connection control method is achieved by receiving from a first terminal, a call request for a communication with a second terminal to notify the call request from a connection control server to an application server; and executing at least a program to receive the call request from the connection control server, to request a connection state data of the second terminal to a storage server in response to the received call request. A connection control instruction for the first and second terminals is issued to the connection control server when there is no connection state data of the second terminal in the storage server or the second terminal in a free state. A connection control between the first and second terminals is performed by the connection control server in response to the connection control instruction; and the connection state data of each of the first and second terminals is stored in the storage server when the connection state between the first and second terminals is changed.

In another aspect of the present invention, a computer-readable software product is provided for realizing a method of controlling a connection between terminals. The method is achieved by receiving from a first terminal, a call request for a communication with a second terminal from the connection control server; by requesting a connection state data of the second terminal to a storage server in response to the received call request; and by issuing a connection control instruction for the first and second terminals to the connection control server when there is no connection state data of the second terminal in the storage server or the second terminal in a free state. The method may be achieved by further controlling the connection control server to call the first and second terminals in response to the connection state data indicating that the second terminal is in the free state, and received from the storage server. Also, the method may be achieved by further receiving the call request from the connection control server; requesting the connection state data between the first and second terminals to the storage server based on the received call request; requesting a connection state data of a substitution destination terminal when the connection state data of the second terminal indicates that the second terminal is in the busy state; and controlling the connection control server to connect the first terminal and the substitution destination terminal.

Also, in another aspect of the present invention, a computer-readable software product is provided for realizing a method of controlling a connection between terminals. The method is achieved by storing a connection state data in a storage server each time a connection state between terminals is changed; by receiving from a first terminal a call request for a communication with a second terminal to notify the call request to an application server which executes at least an application program; and by performing a connection control between the first and second terminals in response to a connection control instruction from the application server.

Here, the call request may contain a source identifier of the first terminal and a destination identifier of a second terminal. The connection control data includes a data indicating a session establishment state between the first and second terminals. The method may be achieved by further issuing a busy notice to the first terminal when the connection state data indicates that the second terminal is in a busy state, so that the first terminal is disconnected. The method may be achieved by further receiving a call request from the first terminal, to notify the call request to the application server; and connecting the first terminal and a substitution destination terminal for the second terminal, when the second terminal is in a busy state.

In another aspect of the present invention, a connection control system includes a storage server in which connection state data are stored; a connection control server and an application server. The connection control server receives from a first terminal, a call request for a communication with a second terminal, notifies the call request, performs a connection control between the first and second terminals in response to a connection control instruction, and stores the connection state data indicating a connection state between the first and second terminals in the storage server when the connection state is changed. The application server receives the call request from the connection control server, requests the connection state data between the first and second terminals to the storage server based on the received call request, and issues the connection control instruction for the first and second terminals to the connection control server.

Here, the connection control server may store the connection state data between the first and second terminals in the storage server when the connection state between the first and second terminals is changed. Also, the connection control data may include a data indicating a session establishment state between the first and second terminals.

The connection control server may issue a busy notice to the first terminal when the connection state data indicates that the second terminal is in a busy state, so that the first terminal is disconnected. In this case, the connection control server may store the connection state data indicating that the second terminal is in a free state, in the storage server. The storage server supplies the connection state data indicating that the second terminal is in the free state to the application server. At this time, the application server may control the connection control server to call the first and second terminals in response to the connection state data indicating that the second terminal is in the free state.

Also, the connection control server may receive a call request from the first terminal, and may notify the call request to the application server. The application server may receive the call request from the connection control server, may request the connection state data between the first and second terminals to the storage server based on the received call request, and may request a connection state data of a substitution destination terminal when the connection state data of the second terminal indicates that the second terminal is in the busy state. The application server may control the connection control server to connect the first terminal and the substitution destination terminal.

In another aspect of the present invention, an application server executes at least an application program for connecting first and second terminals, and is connected to a storage server. In the application server, a requesting section requests a connection state data of the second terminal to the storage server in response to a call request for a communication with the second terminal from the first terminal. An instructing section issues a connection control instruction for the first and second terminals when there is no connection state data of the second terminal in the storage server or the second terminal in a free state.

Here, the instructing section may issue a control instruction to call the first and second terminals in response to the connection state data indicating that the second terminal is in the free state, and received from the storage server. In this case, the requesting section may request the connection state data of the second terminal to the storage server based on the call request, and may request a connection state data of a substitution destination terminal for the second terminal when the connection state data of the second terminal indicates that the second terminal is in the busy state. The instructing section may issue a connection control instruction to connect the first terminal and the substitution destination terminal.

In another aspect of the present invention, a connection control server connects first and second terminals, and is connected to a storage server. In the connection control server, a storing section stores a connection state data in a storage server each time a connection state between terminals is changed. A notifying section notifies a call request in response to reception of the call request for a communication with a second terminal from a first terminal. A control section may perform a connection control between the first and second terminals in response to a received connection control instruction.

Here, the connection control server may further include a message section configured to issue a busy notice to the first terminal when the connection state data indicates that the second terminal is in a busy state, so that the first terminal is disconnected. Also, the control section may connect the first terminal and a substitution destination terminal for the second terminal, when the second terminal is in a busy state.

The present invention has the foregoing configuration and function. Consequently, in the connection control server for performing the connection control of the communication terminal, the connection state data indicating the connection state for each communication terminal is automatically recorded on the basis of the change in the connection state of each communication terminal. Thus, the change of the connection state in the communication terminal is not required to be registered from the communication terminal side, and the connection state of the communication terminal can be surely recorded and used for the various connection control processes. As a result, this has the unparalleled good effect that the communication connection service can be made richer and the quality can be made higher.

DESCRIPTION OF THE PREFERRED EMBODIMENTS

Hereinafter, a connection control system of the present invention will be described in detail with reference to the attached drawings. In the following description, the connection control system between telephone terminals using SIP (Session Initiation Protocol) protocol will be exemplified. However, the present invention can be applied to a system in which a protocol other than the SIP protocol is used for connection control of the communication terminals. Also, as the communication terminal, an IP telephone is exemplified as one example. However, the communication terminal is not limited to this and a different communication terminal such as a portable telephone may be used.

First Embodiment

Figure 3:
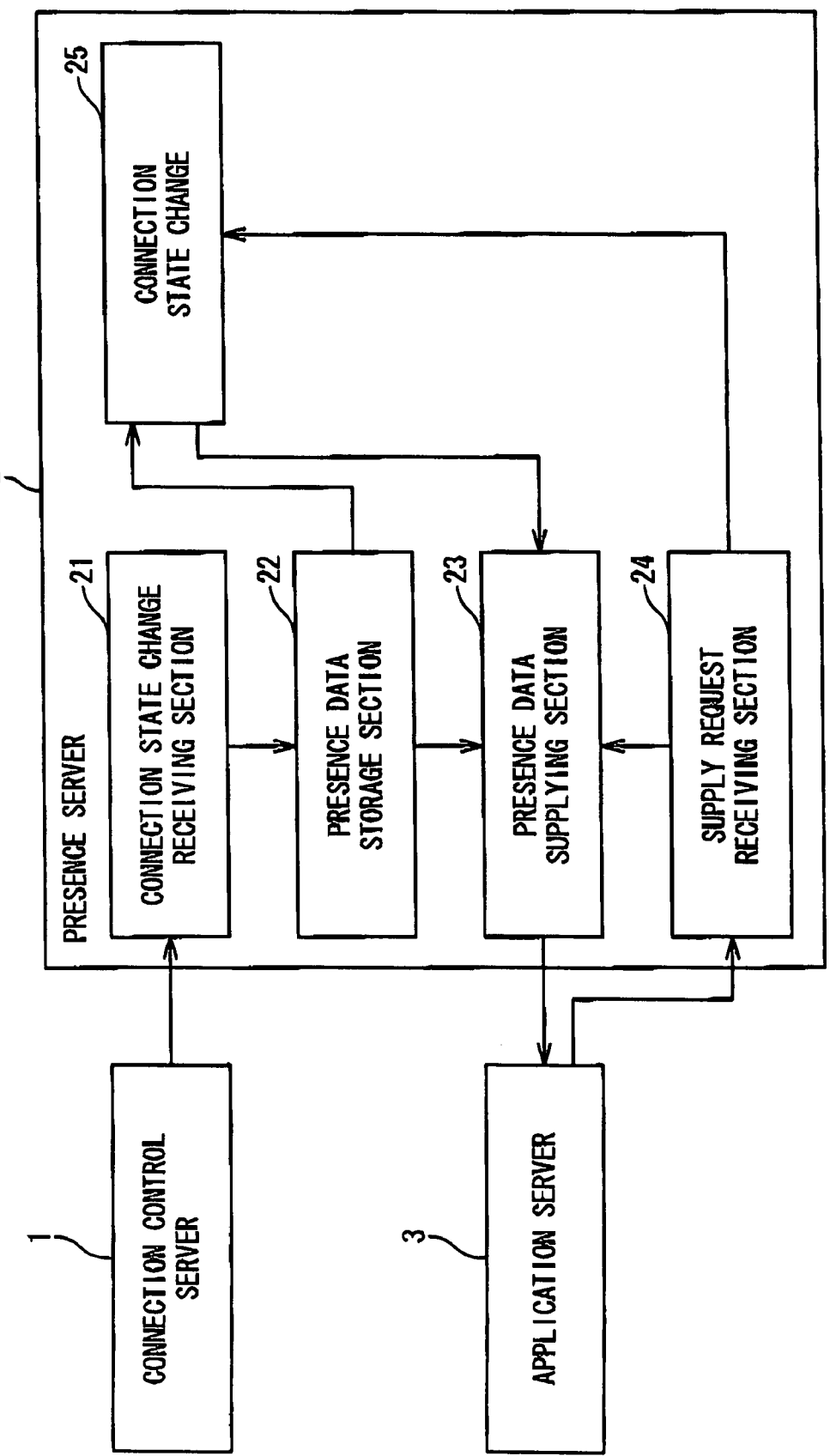
FIG. 3 is a functional block diagram showing a configuration of a presence server disclosed in FIG. 1.
Figure 4:
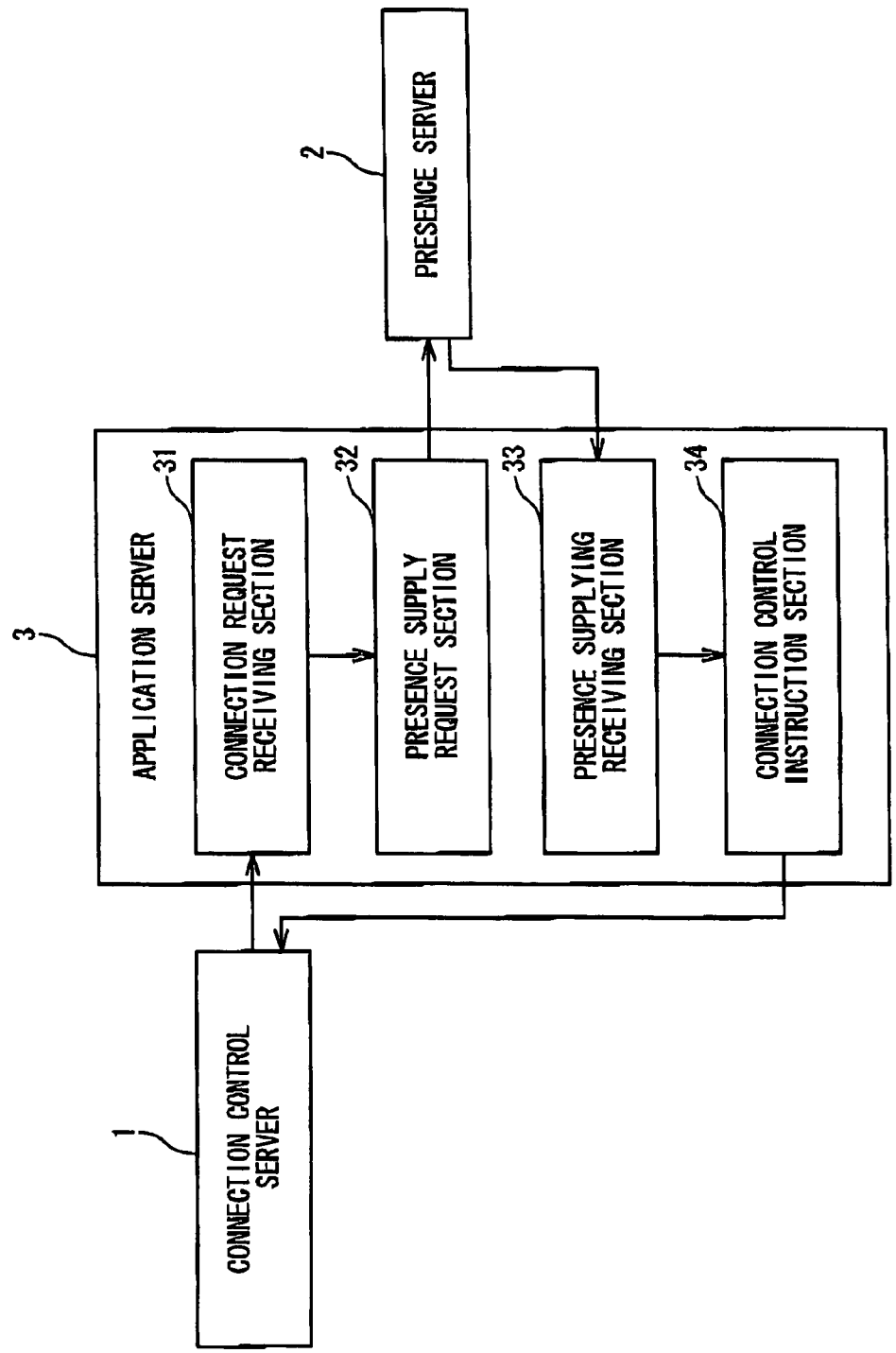
FIG. 4 is a functional block diagram showing a configuration of an application server shown in FIG. 1.
Figure 5:
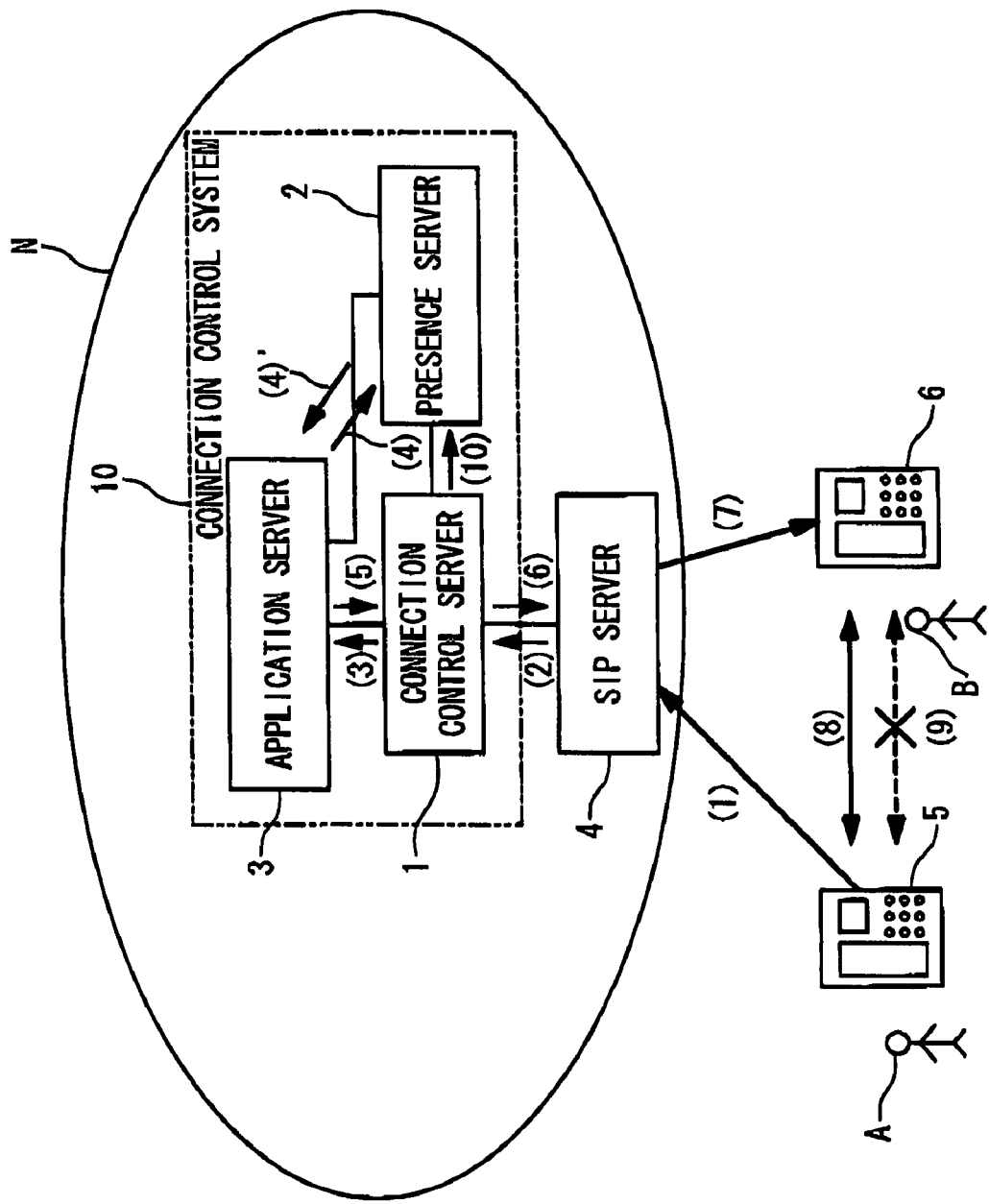
FIG. 5 is an explanation view showing operations of an entire system in the first embodiment.
Figure 6:
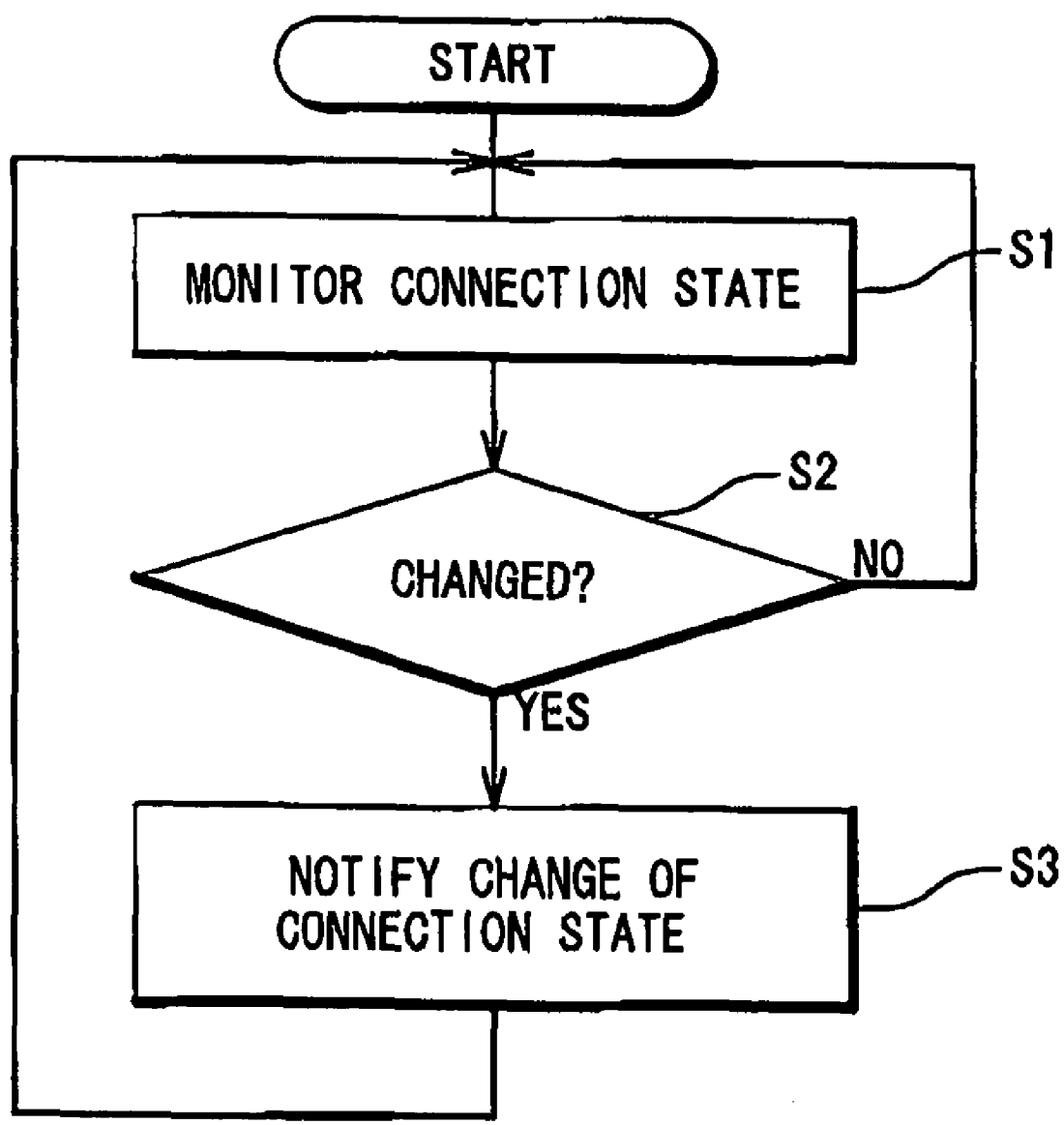
FIG. 6 is a flowchart showing operations of a connection control server in the first embodiment.
Figure 7:
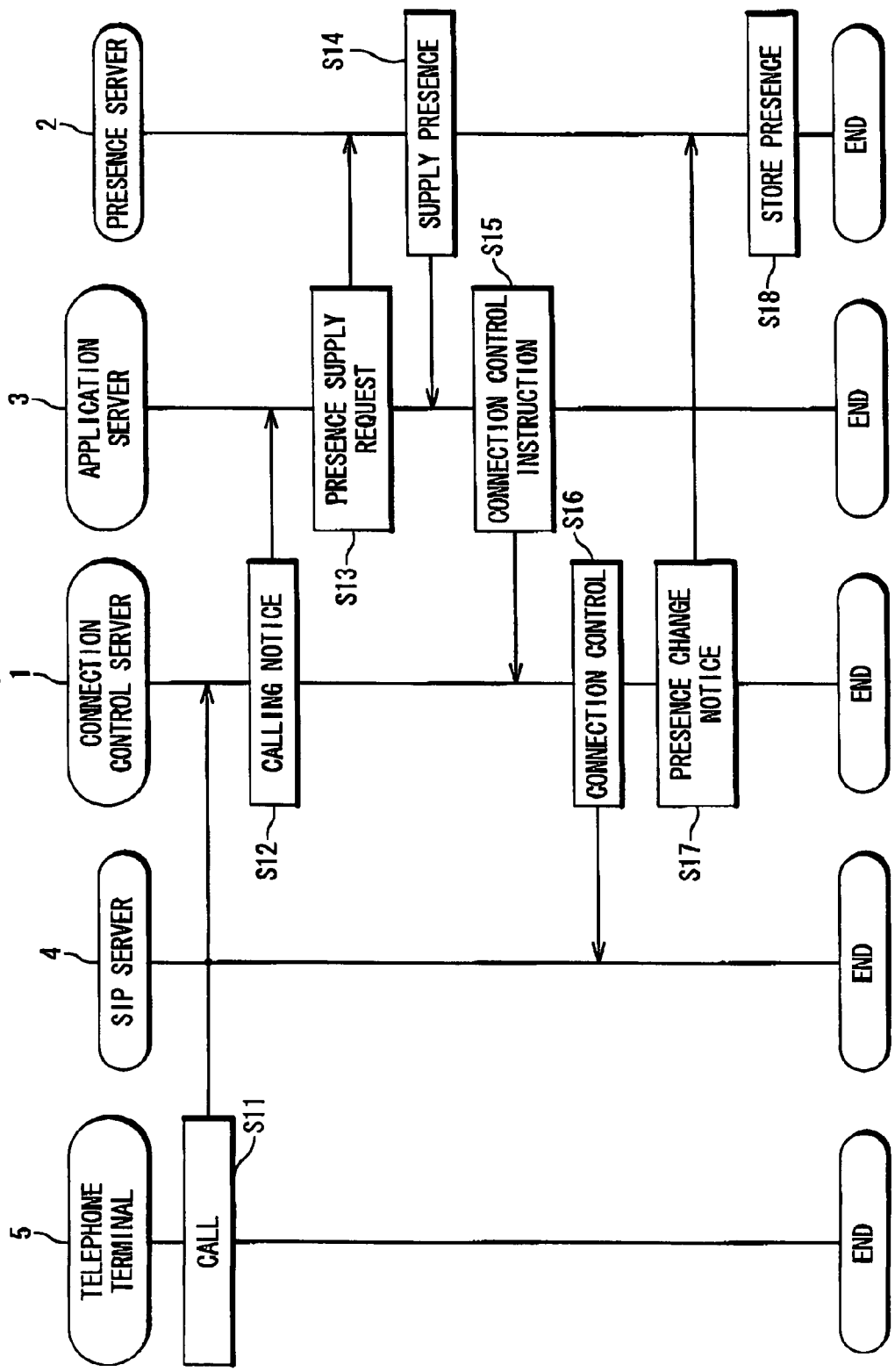
FIG. 7 is a sequence view showing the operations of the entire system in the first embodiment.

The connection control system according to the first embodiment of the present invention will be described below with reference to FIGS. 1 to 7. FIGS. 1 to 4 show the configuration of the connection control system in the first embodiment, and FIGS. 5 to 7 are diagrams showing the operations.

Figure 1:
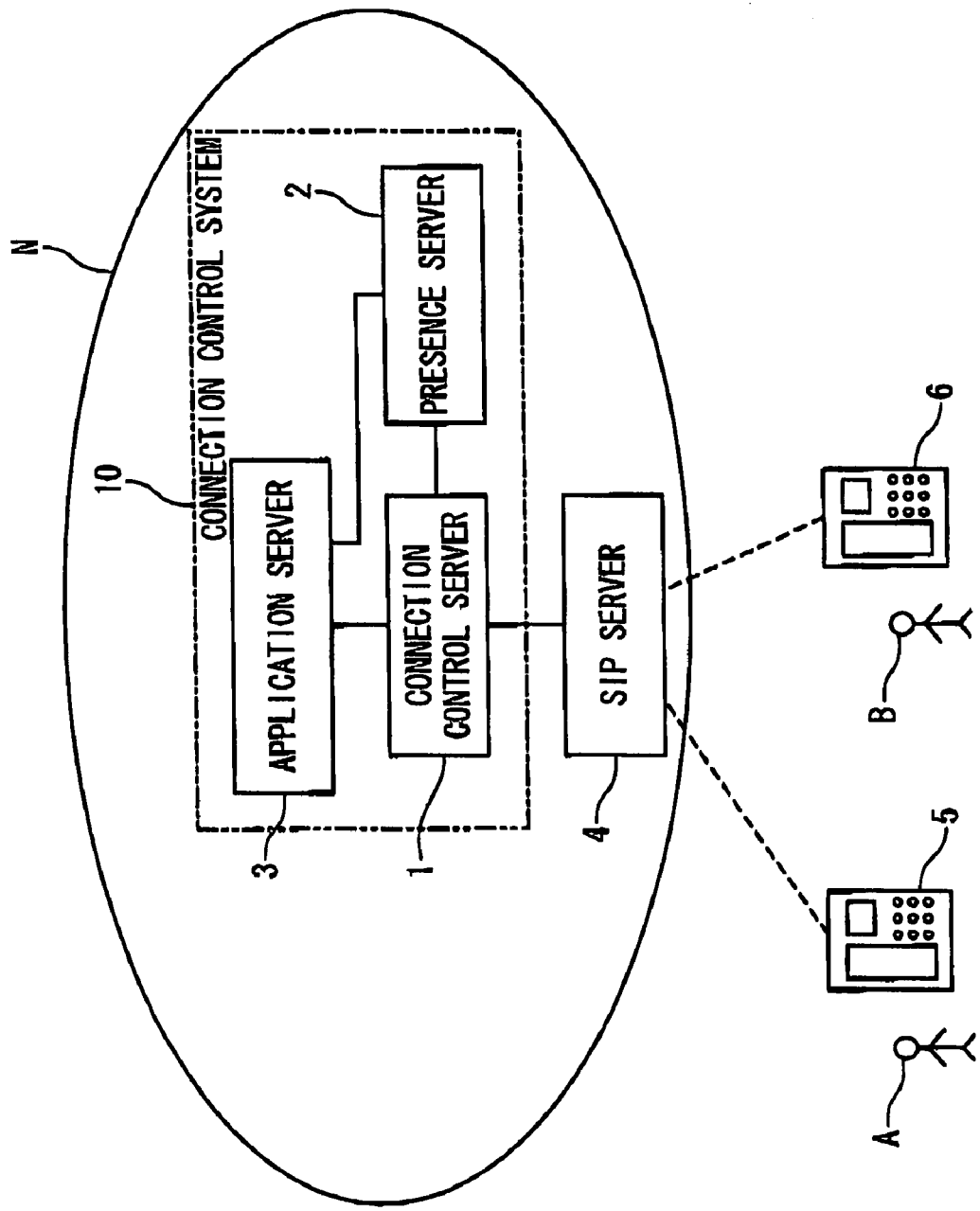
FIG. 1 is a block diagram showing an entire configuration of a network in a first embodiment.

Referring to FIG. 1, in the connection control system in the first embodiment, a telephone terminal 5 of a user A, a telephone terminal 6 of a user B are connected to a network N such as an IP (Internet Protocol) network. It should be noted that a communication terminal of a different user is also connected to the network N. Also, on the network N, an SIP server 4 is installed to perform connection controls such as a call control to an IP telephone or a different telephone and a session establishment in accordance with the SIP protocol. Moreover, on the network N, a connection control system 10 is installed and includes a connection control server 1 for performing the connection control of the IP telephone and the like; a presence server 2 for managing the presence data of the user; and an application server 3 for setting the content of the connection control to the communication terminal to issue a connection control instruction to the connection control server 2. The configuration of each of the components will be described below in detail.

<Telephone Terminal>

At first, the telephone terminals 5 and 6 are IP telephone terminals that are used by the respective users A and B, respectively. The telephone terminals 5 and 6 can be connected to the different telephone terminals and equipments in accordance with a call control and a connection control that are performed by the SIP server 4 on the network N. For example, a call to the different telephone terminal is outputted to the SIP server 4, or a call from the different telephone terminal is received. When the telephone terminal responds to the call, a session between the telephone terminals is established, to make communication possible. Otherwise, when the telephone terminal is connected to the different equipment such as a media server by the SIP server 4, the telephone terminal can receive various kinds of services such as a music reproduction.

<SIP Server>

The SIP server 4 is a server computer for performing a call control and a connection control of the IP telephone, the mobile phone and the like in accordance with the SIP protocol. The SIP server 4 transmits a predetermined message to the respective telephone terminals 5 and 6 in accordance with an instruction from a connection control server 1, which will be described later, and carries out the call control and the connection control. Specifically, the SIP server 4 carries out generation of a call to the telephone terminal 5 or 6, session establishment, and the like.

Here, a gateway (not shown) is provided between the SIP server 4 and the telephone terminals 5 and 6. Thus, signals from the telephone terminals 5 and 6 or signals to the telephone terminals 5 and 6 are converted by the gateway, so that the communication between the telephone terminals 5 and 6 and the SIP server 4 is made possible to attain the call control.

<Connection Control Server>

Figure 2:
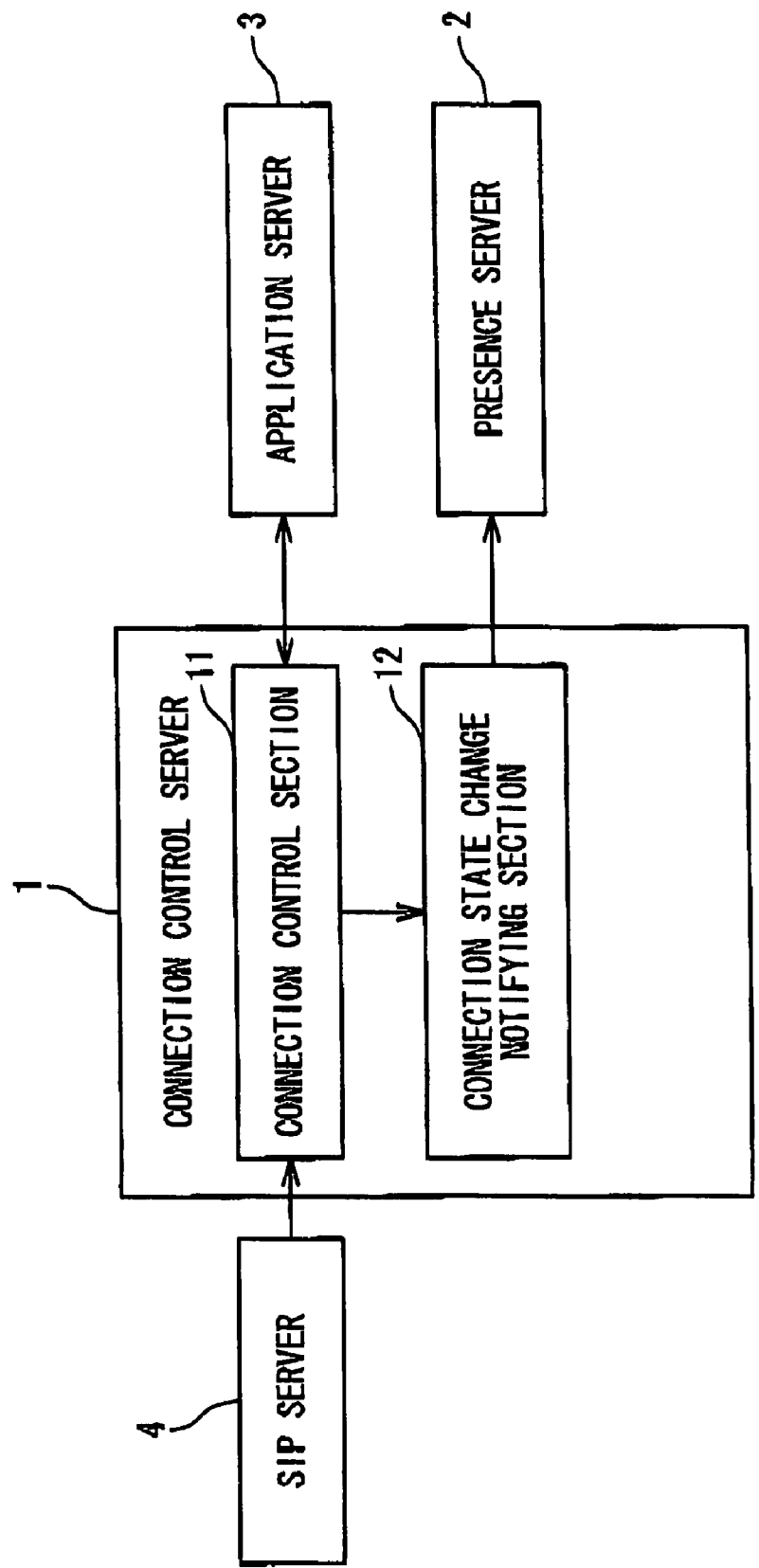
FIG. 2 is a functional block diagram showing a configuration of a connection control server disclosed in FIG. 1.

The connection control server 1 is a typical server computer that has a calculating operation unit such as a CPU, and a storage unit such as a hard disc. A predetermined program is executed by the calculating operation unit, to accomplish a connection control section 11 and a connection state change notifying section 12, as shown in FIG. 2. The respective components will be described below in detail.

The connection control section 11 receives a call request from the telephone terminal 5 through the SIP server 4 in accordance with the SIP protocol, and converts the protocol of the call request into an HTTP (Hyper Text Transfer Protocol) protocol to notify to the application server 3. At this time, the connection control section 11 notifies the data included in the call request, namely, a transmitter number, a receiver number, an assigned session ID and the like to the application server 3. Also, the connection control section 11 receives a connection control instruction transmitted from the application server 3, which will be described later, and performs the connection control on the telephone terminal 5 in accordance with the instruction. For example, the connection control section 11 carries out a calling to a different telephone terminal (reception terminal), session establishment, or a call rejection, a transfer and the like, and further specifies a different server which announces a guidance and the like, and carries out the connection control for the session establishment to it. Also, the connection control section 11 notifies the connection state of the telephone terminal that is changed by the execution of the connection control; and the connection state between the telephone terminals 5 and 6 that are received from the SIP server 4, to the connection state change notifying section 12.

When receiving a notice of the connection state change in the telephone terminals 5 and 6 from the connection control section 11, the connection state change notifying section 12 transmits the connection state data indicating the connection state so that it is stored in the presence server 2. At this time, the connection state data for each telephone terminal 5 or 6, for example, the state with regard to the session establishment to a different call terminal such as a call connection state/a calling state/a disconnection, and various connection states such as a guidance calling state/a connection completion/a disconnection, and a connection destination switching state/a completion are transmitted to the presence server 2. In particular, the transmission of the connection state data is performed for each change in the connection state in the respective telephone terminals 5 and 6.

<Presence Server>

The presence server 2 will be described below. The presence server 2 is a database server for managing presence data of the telephone terminals 5 and 6, in short, the use state of the telephone terminals 5 and 6 of the users A and B, and situations such as a presence state, a absence state, an out-of-office state and a meeting state in a company. Specifically, a predetermined program is loaded in a calculating operation unit to build up a connection state change receiving section 21, a presence data storage section 22, a presence data supplying section 23 and a supply request receiving section 24, as shown in FIG. 3. Also, a presence data storage section 25 stores the presence data including the connection state data of the respective users A and B.

The connection state change receiving section 21 receives the connection state data of the telephone terminal 5 or 6 transmitted by the connection control server 1 and notifies it to the presence data storage section 22. Then, the presence data storing section 22 stores the received connection state data in the presence data storage section 25 for each of the telephone terminals 5 and 6 of the users A and B. At this time, as mentioned above, the connection control server 1 transmits the connection state data for each change in the state of the telephone terminal. Thus, for each transmission, the connection state data is stored in the presence server 2, and the newest states of the telephone terminals 5 and 6 are consequently held.

Also, as described later, when a data indicating a request of the connection state data to a particular telephone terminal is transmitted by a particular application loaded or installed in the application server 3, the supply request receiving section 24 receives this data and notifies the request of the connection state data to the presence data supplying section 23 and registers it in the presence data storage section 25. The presence data supplying section 23 has a function to supply the connection state data stored in the presence data storage section 25 to the application server 3, as mentioned above. In particular, only the connection state data of the telephone terminals 5 and 6 requested by the application server 3 are supplied to the requesting application. At this time, the presence data supplying section 23 supplies the connection state data, each time the connection state data is recorded in the presence data storing section 22 as mentioned above. Thus, immediately when the connection state of the telephone terminal is changed, the connection state data is notified to the application server 3.

It should be noted that a case where the connection control server 1 transmits the connection state data to the presence server 2 and the connection state data is stored in the presence server 2 is described in this embodiment. However, the connection state data may be stored in any storage section such as a storage section provided in the connection control server 1, a storage section of a different computer. In that case, an apparatus in which the connection state data is stored supplies the connection state data to the application server 3.

<Application Server>

The application server 3 will be described below. The application server 3 is a server computer for setting a data indicating the connection control to the telephone terminal and issuing an instruction to the connection control server 1. Then, one or plurality of applications are installed for setting the connection control data. A predetermined program is installed or loaded in the calculating operation unit, to accomplish a connection request receiving section 31, a presence supply request processor 32, a presence provision receiving section 33 and a connection control instruction section 34, as shown in FIG. 4. A plurality of application servers 3 may be provided.

The connection request receiving section 31 receives call requests from the telephone terminals 5 and 6 through the SIP server 4 and the connection control server 1. Specifically, the connection request receiving section 31 receives data such as a transmitter number/a receiver number/a session ID from the connection control server 1 and notifies it to the presence supply request processor 32.

The presence supply request section 32 requests the connection state data of one or both of the telephone terminals 5 and 6 to the presence server 2 in accordance with the received call request, in order to check the current and future connection states of the telephone terminals 5 and 6 on the transmitting and reception sides. For example, the presence supply request section 32 specifies a telephone terminal of the receiver serving as a call destination for each application, and requests the connection state data to the presence server 2. At this time, the presence supply request section 32 issues a request to supply the connection state data for each change in the connection state of the telephone terminal to be specified.

The presence supplying receiving section 33 obtains the connection state data of the telephone terminal that is transmitted by the presence server 2 in response to the above request. At this time, there is a case that the presence server 2 transmits it immediately after the reception of the request, or there is a case that it is transmitted when any change is generated in the connection state data in future. In any case, the connection state data is received and notified to the connection control instruction section 34.

The connection control instruction section 34 carries out a process of setting a data of connection control of the telephone terminal on the calling side in accordance with the connection state data of the telephone terminal on the reception side. It should be noted that the setting of the connection control data is different depending on the application. For example, in case of an application for a usual call connection, if the telephone terminal on the reception side is in the calling state, the call to the telephone terminal on the reception side is stopped, and a guidance is announced to notify a busy state to the telephone terminal on a transmission side. It should be noted that another example of the connection control data will be described in another embodiment. An instruction is issued to the connection control server 1 so that the connection control is performed in accordance with the connection control data. Here, the presence server 2 notifies the connection state data for each change in the connection state of the requesting telephone terminal. Thus, the process of setting the connection control data is performed for each notice, depending on the application. For example, when it is recognized based on the connection control data that the telephone terminal on the reception side becomes free, the connection control can be attained so that the calls to both the telephone terminals are generated to connect them.

Next, the operation of the connection control system will be described below with reference to FIGS. 5 to 7. FIG. 5 is a diagram showing a control flow of data in the entire system. FIG. 6 is a flowchart showing the operation of the connection control server 1. FIG. 7 is a sequence diagram showing the operation of the entire system. The operation of storing connection state data from when a user A calls a user B to when a communication is executed and then the call is disconnected will be described.

At first, the user A uses the telephone terminal 5 to generate a call for the telephone terminal 6 of the user B. The call is notified through the SIP server 4 to the connection control server 1 as shown by arrows (1) and (2) in FIG. 5 at a step S11 in FIG. 7. The connection control server 1 notifies a transmission terminal number/a reception terminal number and the like, which are the call content, to the application server 3, as shown by an arrow (3) of FIG. 5 at a step S12 of FIG. 7. At this time, in the user A on the transmission side or the user B on the reception side, the call is notified to a predetermined application for performing a pre-registered connection control process.

Subsequently, the application server 3 requests the connection state data of the telephone terminal 6 on the reception side to the presence server 2, as shown by an arrow (4) in FIG. 5 at a step S13 of FIG. 7. In response to this request, the presence server 2 supplies the stored connection state data of the telephone terminal 6 on the reception side to the application server 3, as shown by an arrow (4)' of FIG. 5 at a step S14 of FIG. 7. At this time, it is supposed that the telephone terminal 6 on the reception side is not in the busy state, and any connection state is not registered in the connection state data. Since the telephone terminal 6 on the reception side is not busy, the application server 3 sets the connection control content so that the call control is carried out and then issues an instruction to the connection control server 1, as shown by an arrow (5) of FIG. 5 at a step 515 of FIG. 7.

The connection control server 1 receives the call control instruction as mentioned above and calls the telephone terminal 6 of the user B through the SIP server 4, as shown by arrows (6) and (7) of FIG. 5 at a step S16 of FIG. 7. At this time, since the connection state between the telephone terminals 5 and 6 on which the connection control is to be performed is changed to a [Call Connection State], the connection control server 1 notifies this change as the connection state data for each of the telephone terminals 5 and 6 to the presence server 2, as shown by an arrow (10) of FIG. 5 at a step S17 of FIG. 7. In response to this, the notified connection state data is stored in the presence server 2 in a step S18 of FIG. 7. In this way, the connection control server 1 monitors the connection state between the telephone terminals 5 and 6, as shown in FIG. 6 (Step S1), and if any change occurs (Yes at Step S2), the connection state data indicating such a connection state is notified to the presence server 2 and stored in it (Step S3).

When the user B responds to the call from the connection control server 1 by using the telephone terminal 6, a session between the telephone terminals 5 and 6 of the users A and B is established to allow communication. In this case, the connection state between the telephone terminals 5 and 6 is changed to [Communication State]. Thus, the connection state data is notified from the connection control server 1 to the presence server 2, and stored in the presence server 2. Moreover, in case that the connection between the telephone terminals 5 and 6 is [disconnected], the connection state data is similarly notified from the connection control server 1 to the presence server 2 and stored therein.

In this way, the connection state data having stored in the presence server 2 is provided to the application server 3, when the call is issued to the telephone terminal 5 or 6 in future, similarly to the foregoing case. When a request is issued from the application server 3, the connection state data is naturally provided to the application server 3, as well as when any change occurs in the connection state between the telephone terminals 5 and 6.

As mentioned above, according to the present invention, when the connection control server 1 performs the connection control of the telephone terminal and carries out a process such as the call control, the connection state data indicating the connection state for each of the telephone terminals 5 and 6 is automatically recorded in the presence server 2 in accordance with the change in the connection state. Thus, the users A and B themselves are not required to register the presence data indicating the connection state. Therefore, the connection state between the telephone terminals can be stored more suitably in substantial real time, and such data can be used in various connection control processes.

As mentioned above, the actual connection control process for the telephone terminals 5 and 6 and the process for setting this connection control data are distributed to the connection control server 1 and the application server 3. Thus, loads associated with the respective processes can be distributed. Consequently, the higher speed of the connection control process and the setting process for the connection control data can be attained while the setting process requires a heavy load. Thus, the connection control service that is high in quality and rich in content can be provided. However, the connection control server 1 and the application server 3 are not always required to be separated, and they may be configured by one server computer.

Also, in the foregoing description, the storage of the connection state data is carried out in the presence server 2, and the database is separated. Thus, the use efficiency of the database is made higher. However, the separation of the presence server 2 is not always limited.

Second Embodiment

Figure 8:
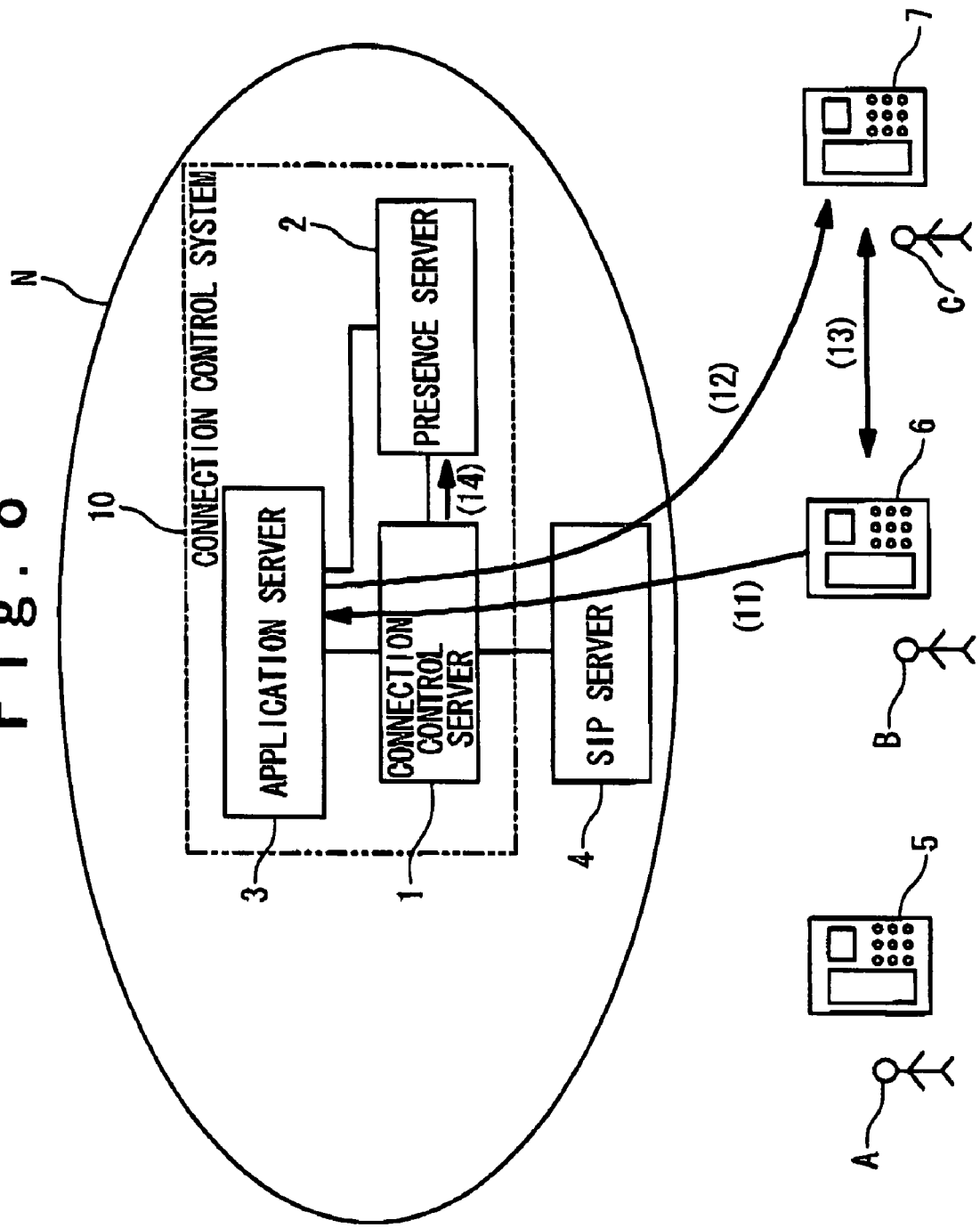
FIG. 8 is an explanation view showing operations of an entire system in a second embodiment.
Figure 9:
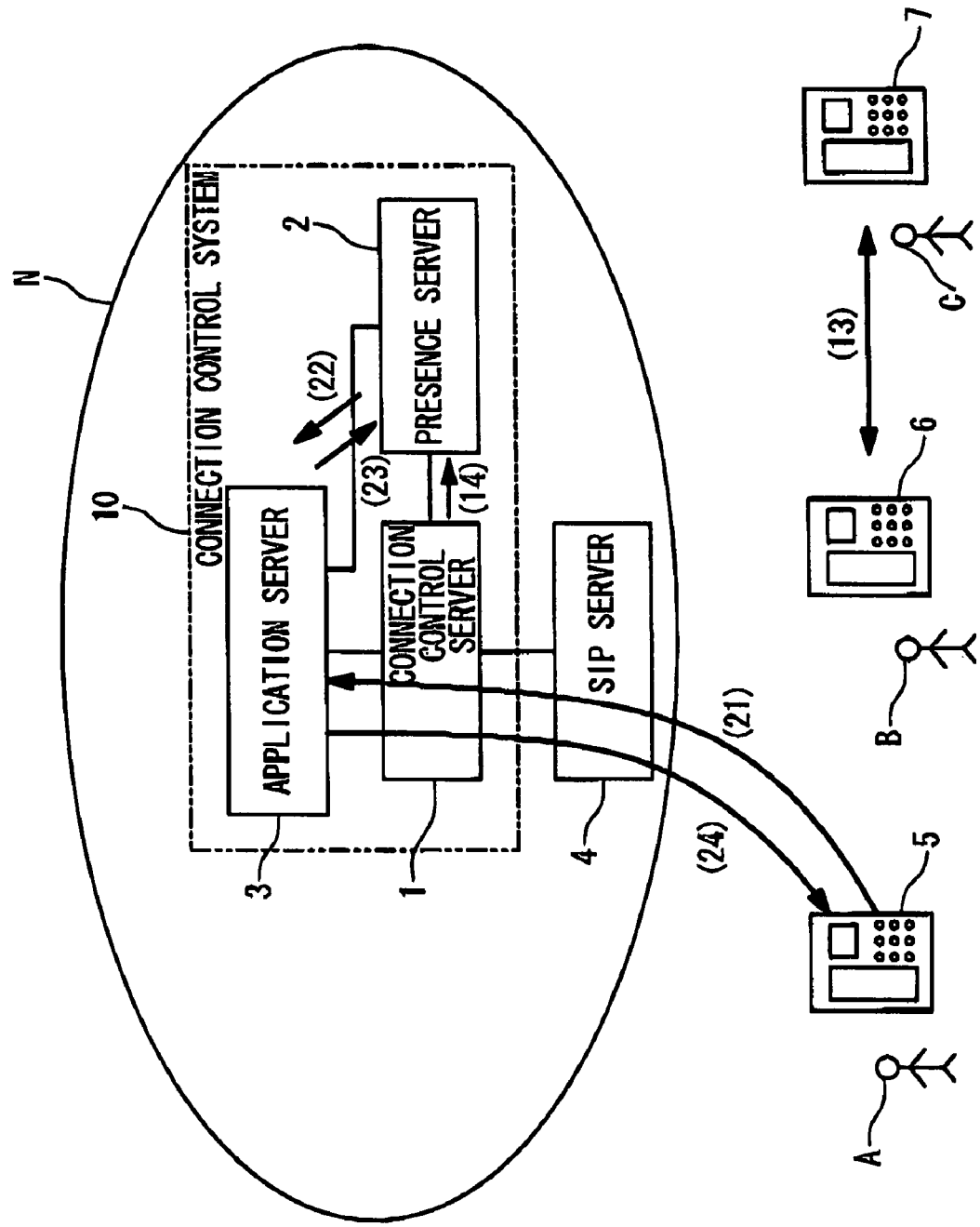
FIG. 9 is an explanation view showing the operations of the entire system in the second embodiment.
Figure 10:
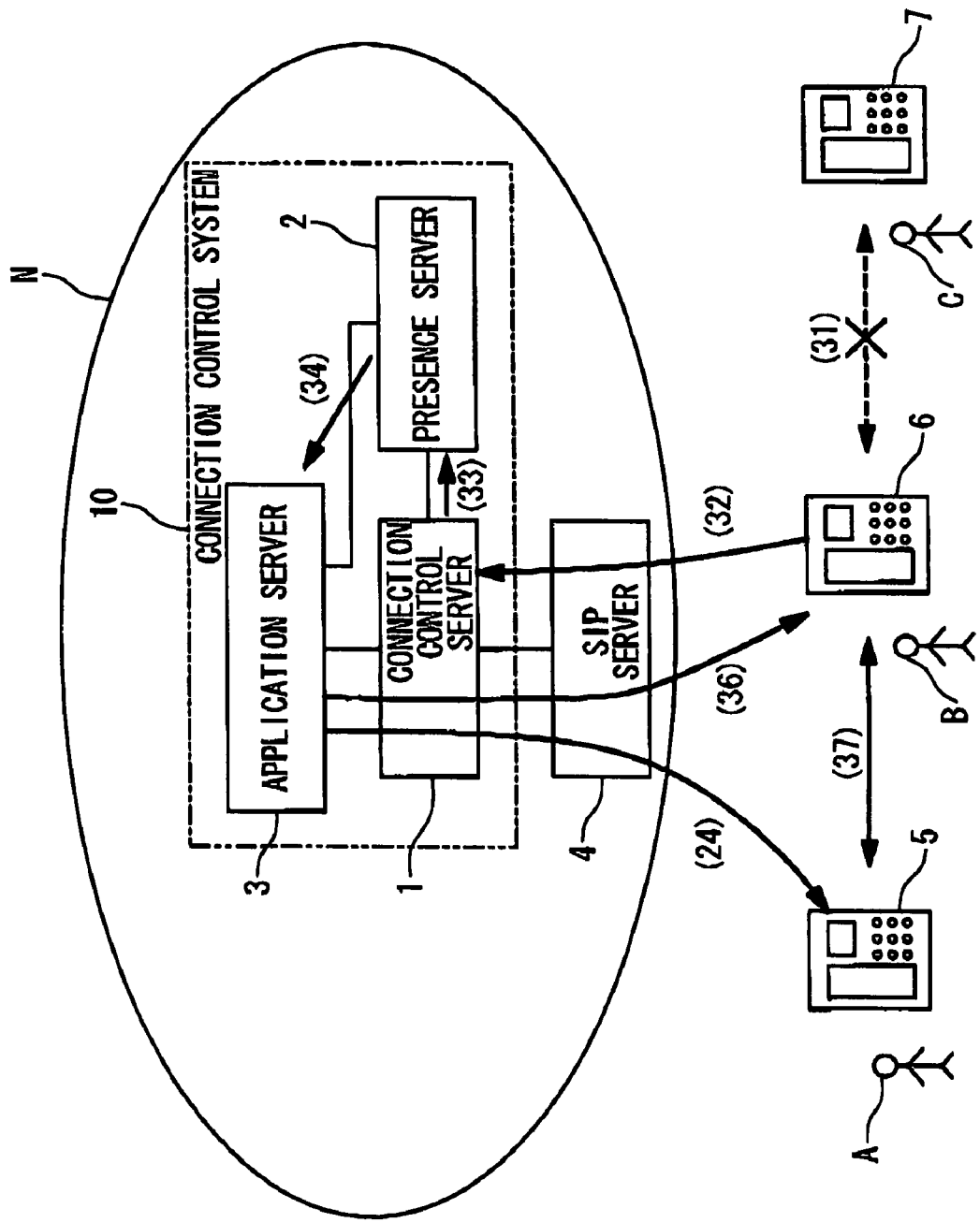
FIG. 10 is an explanation view showing the operations of the entire system in the second embodiment.
Figure 11:
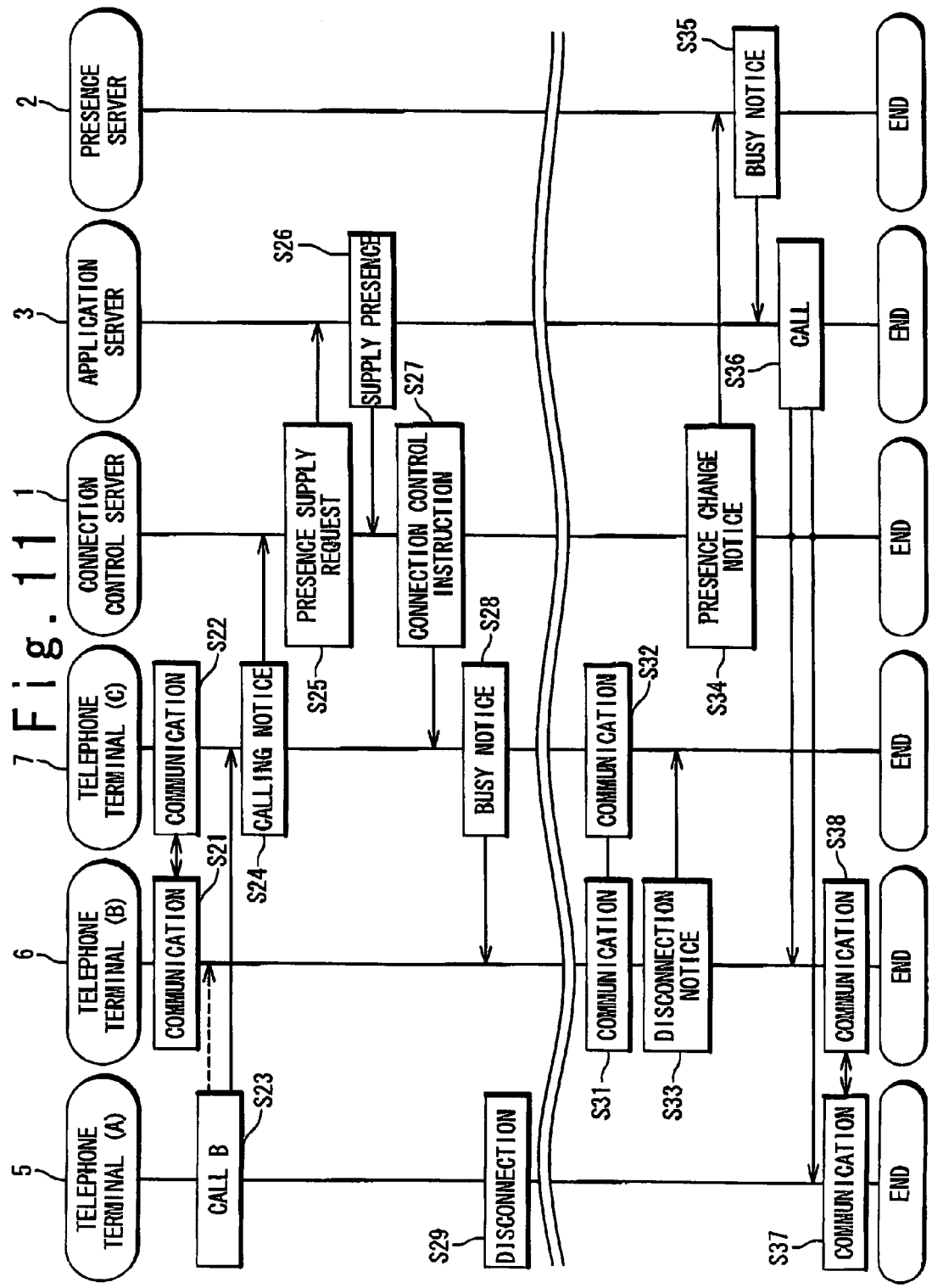
FIG. 11 is a sequence view showing the operations of the entire system in the second embodiment.

The connection control system according to the second embodiment of the present invention will be described below with reference to FIGS. 8 to 11. FIGS. 8 to 10 are diagrams showing data flows in the system, and FIG. 11 is a sequence diagram showing the operations of the entire system. The connection control system in this embodiment will be described by taking as an example, a connection control in which the connection state data is used as the presence data of each user stored in the presence server 2 as mentioned above.

At first, the outline of this embodiment will be described. In this embodiment, it is assumed that as shown in FIG. 8, there are the telephone terminals 5, 6 and 7 operated by the users A, B and C, respectively, and a communication is firstly carried out between the user B and the user C. In this state, when the user A calls the user B, the user A cannot communicate with the user B. However, call reservation is carried out by a predetermined application of the application server 3. Then, when the communication of the user B has been ended, both the telephone terminals 5 and 6 of the users A and B are called by the application server 3. When the respective users A and B respond to these calls, the communication is attained. Its operation will be described below in detail with reference to the drawings.

At first, as shown in FIG. 8, it is supposed that a call is issued from the telephone terminal 6 of the user B to the telephone terminal 7 of the user C, as shown by arrows (11) and (12), the user C responds to the call so that the session is established between both the telephone terminals 6 and 7, and the communication is being carried out, as shown by an arrow (13) and performed at steps S21 and S22 of FIG. 11. Then, as described in the first embodiment, the data of [communication State] is registered on the presence server 2 as the connection state data indicating the connection state between both the telephone terminals 6 and 7 by the connection control server 1, as shown by an arrow (14).

Next, as shown in FIG. 9, when a call request is issued from the telephone terminal 5 of the user A to the telephone terminal 6 of the user B, the call request is notified through the SIP server 4 (not shown in FIG. 11) to the connection control server 1, like the first embodiment, as shown by an arrow (21) and performed at a step S23 of FIG. 11. The connection control server 1 notifies a transmission terminal number/a reception terminal number and the like, which are the call content, to the application server 3, as performed at a step S24 of FIG. 11.

Subsequently, the application server 3 requests the connection state data of the telephone terminal 6 of the user B on the reception side, to the presence server 2, as shown by an arrow (22) and performed at a step S25 of FIG. 11. At this time, the application requests to notify each change in the state of the telephone terminal 6 of the user B. In response to this, the presence server 2 firstly provides the currently stored connection state data of the telephone terminal 6 of the user B to the application server 3, as shown by an arrow (23) and performed at a step S26 or FIG. 11. At this time, since the telephone terminal 6 of the user B is in the communication state with the telephone terminal 7 of the user C as shown by an arrow (13), the connection state data of [Communication State] is provided to the application server 3. Simultaneously, the presence server 2 is set to notify the connection state data to the application server 3, when a change occurs in the connection state data of the telephone terminal 6 of the user B.

Next, the application server 3 receives the connection state data of the user B at the time of the issuing the call request, and suspends the call request since the telephone terminal 6 of the user B is in the busy state. The application server 3 sets the communication reservation in such a manner that the connection between the telephone terminals 5 and 6 of the users A and B is carried out after the telephone terminal 6 of the user B is not busy. At this time, the telephone terminal 6 of the user B is busy. Therefore, the application server 3 instructs the connection control server 1 to notify the busy state to the telephone terminal 5 of the user A (Step S27 of FIG. 11). In response to this, the connection control server 1 reproduces a predetermined guidance and then performs the connection control to notify the busy state to the telephone terminal 5. Thereafter, the connection is disconnected as shown by an arrow (24) and performed at steps S28 and S29 of FIG. 11.

After that, when the communication is completed between the telephone terminals 6 and 7 of the users B and C and the session is disconnected, as shown by an arrow (31) of FIG. 10 and performed at steps S31 and S32 of FIG. 11, the disconnection is notified from the telephone terminal 6 through the SIP server 4 to the connection control server 1, as shown by an arrow (32) of FIG. 10 and performed at a step S33 of FIG. 11. Then, the connection control server 1 monitors the connection state of the telephone terminal 6 to detect the change in the connection state and notifies this change to the presence server 2 as shown by an arrow 33 of FIG. 10 at a step S4 of FIG. 11.

Subsequently, the presence server 2 provides the connection state data to the requesting application in the application server 3 when the connection state of the telephone terminal 6 of the user B is changed since the change in the connection state data has been previously requested, as shown by an arrow (34) of FIG. 10 at a step S5 of FIG. 11. In response to this, the application server 3 instructs the connection control server 1 to issue a call to the telephone terminal 6 and the telephone terminal 5 of the user A since the telephone terminal 6 of the user B is not busy and the communication reservation is performed. Consequently, the calls are issued to both the telephone terminals 5 and 6, as shown by arrows (35) and (36) of FIG. 10 at a step S36 of FIG. 11. Then, when the users A and B respond to the calls, a session is established between the telephone terminals 5 and 6, and the communication becomes possible as shown by an arrow (37) of FIG. 10 at steps S37 and S38.

Third Embodiment

Figure 12:
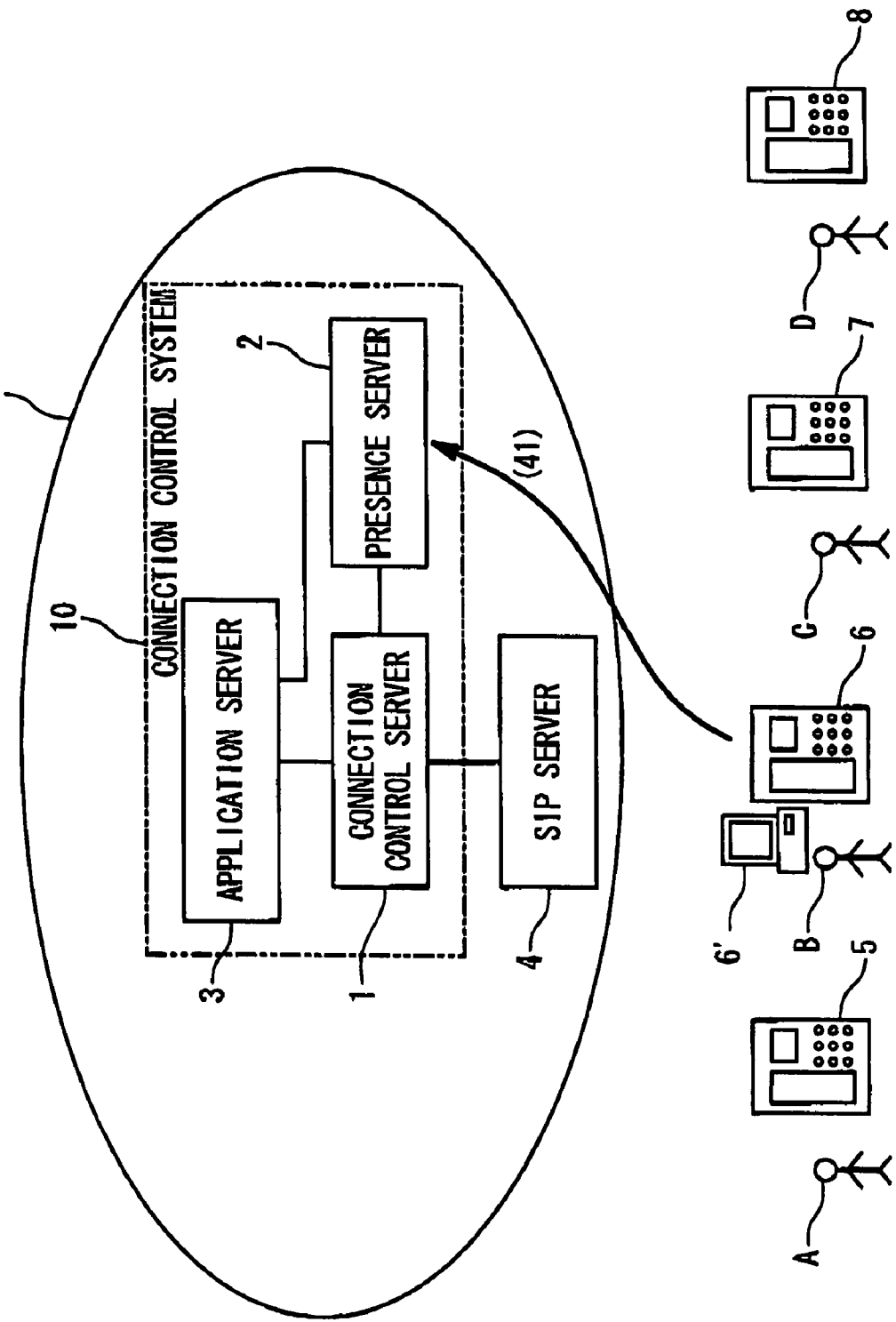
FIG. 12 is an explanation view showing operations of an entire system in a third embodiment.
Figure 13:
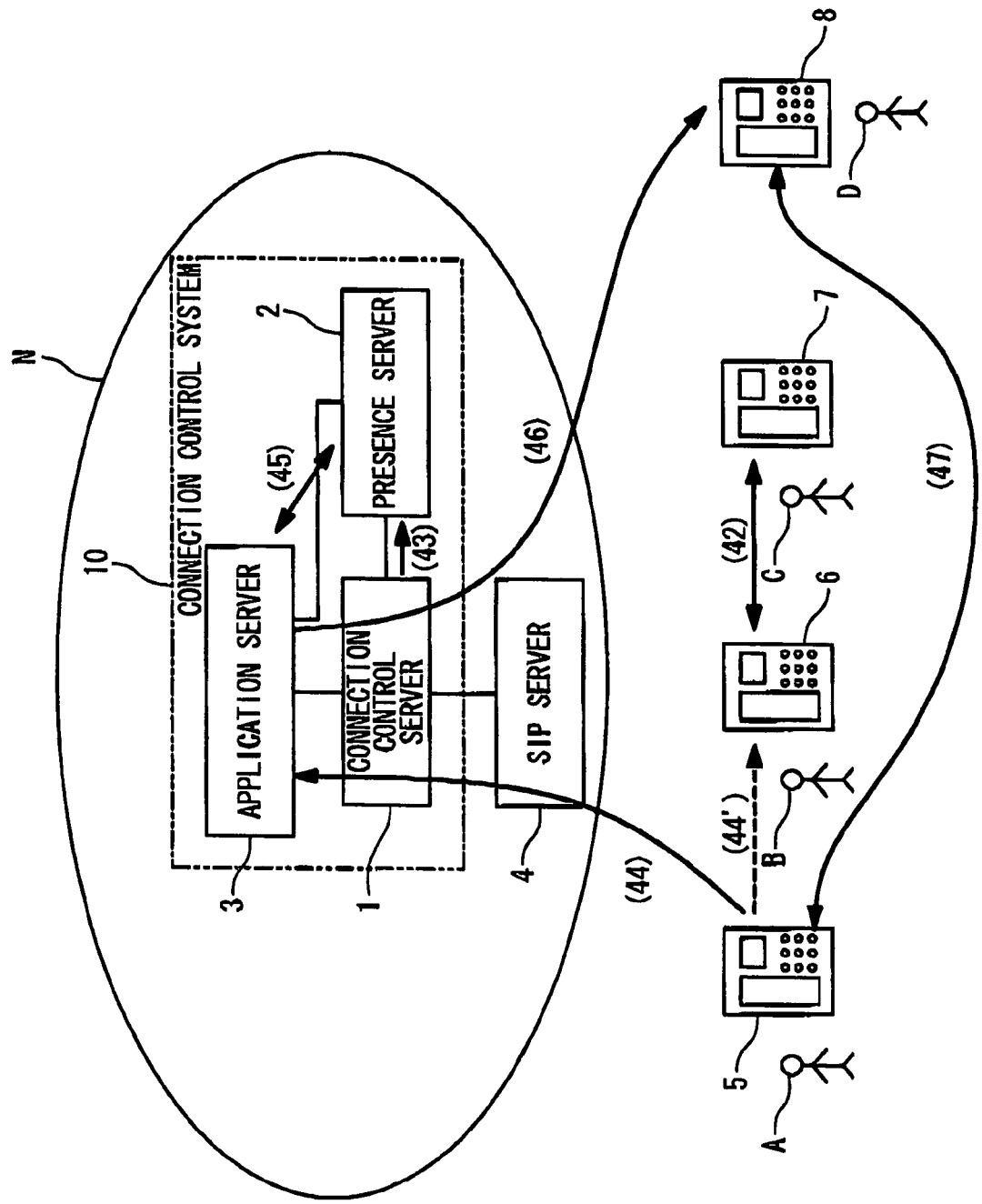
FIG. 13 is an explanation view showing the operations of the entire system in the third embodiment.

The connection control system according to the third embodiment of the present invention will be described below with reference to FIGS. 12 and 13. FIGS. 12 and 13 are diagrams showing data flows in the system. This embodiment will be described by taking as an example, the connection control using the connection state data that is the presence data of each user which has been stored in the presence server 2 as mentioned above.

At first, the outline of this embodiment is described. In this embodiment, as shown in FIG. 12, there are the telephone terminals 5 and 6, 7 and 8 operated by the users A, B, C and D, respectively. The telephone terminal 8 of the user D is specified and registered in the presence server 2 as a transfer destination when the user B is in the communication state. In such a situation, when the user A issues a call to the user B, the user B is already in the communication state. Thus, the connection control is instructed to the application of the application server 3 to transfer the call to the telephone terminal 8 of the user D. The operations will be described below in detail with reference to the drawings.

At first, as shown in FIG. 12, the presence server 2 is accessed from an data processing terminal 6' of the user B through the network, to register a transfer destination data, as shown by an arrow (41). Here, the number of the telephone terminal 8 of the user D belonging to a company of the user B is registered as a transfer destination. It should be noted that the registration of the transfer destination is not always limited to the presence server 2. The transfer destination may be registered in a storage unit that can be referred by the application server 3 in which the application performing the transferring process is installed or loaded.

After that, as shown in FIG. 13, it is supposed that a call is issued from the telephone terminal 6 of the user B to the telephone terminal 7 of the user C, both of the users B and C respond to this call, so that the session is established between the telephone terminals 6 and 7 to allow communication, as shown by an arrow (42). In this state, the presence server 2 has a data of [Communication State] as the connection state data indicating the connection state between the telephone terminals 6 and 7, which data has been registered in the presence server 2 by the connection control server 1, like the first embodiment, as shown by an arrow (43).

After that, when a call request is issued from the telephone terminal 5 of the user A to the telephone terminal 6 of the user B as shown by an arrow (44)', the call request is notified through the SIP server 4 to the connection control server 1, similarly to the first embodiment. The connection control server 1 notifies the transmission terminal number/the reception terminal number and the like, which are the call content, to the application server 3, as shown by an arrow (44).

Subsequently, the application server 3 requests the connection state data of the telephone terminal 6 of the user B on the reception side, to the presence server 2 as shown by an arrow (45). In response to this, the presence server 2 provides the currently stored connection state data of the telephone terminal 6 of the user B to the application server 3 as shown by an arrow (45). Then, since the telephone terminal 6 of the user B is communicating with the telephone terminal 7 of the user C as shown by an arrow (42), the connection state data of [Communication State] is provided to the application server 3. At this time, as the presence data including the connection state data, the foregoing transfer destination data is also provided to the application server 3.

Subsequently, the application server 3 suspends this call, since the telephone terminal 6 of the user B that is in the busy state of the communication, and then sets the connection control data so that the call is transferred to the telephone terminal 8 of the user D as the transfer destination for the user X, and then issues an instruction to the connection control server 1. In response to the instruction, the connection control server 1 issues a call to the telephone terminal 8 of the user D as shown by an arrow (46). Then, when the user D responds to this call, a session between the telephone terminals 5 and 8 of the users A and D is established as shown by an arrow (47), to allow a communication. In short, the call to the user B is transferred.

Fourth Embodiment

The connection control system according to the fourth embodiment of the present invention will be described below. This embodiment will be described by taking a case of performing a charging process based on the connection state, as one example.

An application loaded or installed in the in this embodiment executes a process of charging a call fee on the basis of the call state between telephone terminals. Specifically referring to FIG. 5, similarly to the above description, when the application server 3 receives a call notice from the telephone terminal 5 on the transmission side through the SIP server 4 and the connection control server 1, the application server 3 requests the presence server 2 to provide the connection state data of the telephone terminal 5. Similarly to the above description, the connection control server 1 notifies the connection control data to the presence server 2 for each change in the state of the telephone terminal. Thus, the connection control data is stored in the presence server 2. Simultaneously, the connection control data is notified from the presence server 2 to the application server 3 for each new storage or update.

In this way, since the application server 3 receives the connection state data of the telephone terminal 5, the application server 3 can detect the connection state of the telephone terminal 5. Then, the application server 3 starts a charging process when the terminal is in the communication state and stops the charging process at the time of the disconnection. Thus, the charging process for the communication fee in a prepaid service can be made in real time.

In the above-mentioned embodiments, the connection control data of the telephone terminal are stored in the presence server 2 and are used to attain various connection control processes by the application server 3. However, it should be noted that the connection control processes performed by the application server 3 are not limited to the above contents.

What is claimed is:

1. A connection control method comprising:
   a connection control server receiving from a first terminal, a call request for a communication with a second terminal to notify the call request from said connection control server to an application server;
   said application server executing at least a program to receive the call request from said connection control server, to request a connection state data of said second terminal to a storage server in response to the received call request;
   said application server issuing a connection control instruction for said first and second terminals to said connection control server when there is no connection state data of said second terminal in said storage server or said second terminal in a free state;
   said connection control server performing a connection control between said first and second terminals by said connection control server in response to the connection control instruction; and
   said connection control server storing the connection state data of each of said first and second terminals in said storage server when the connection state between said first and second terminals is changed.

2. A computer-readable storage medium for realizing a method of controlling a connection between terminals, wherein said method comprises:
   a connection control server receiving from a first terminal, a call request for a communication with a second terminal from said connection control server;
   an application server requesting a connection state data of said second terminal to a storage server in response to the received call request; and
   said application server issuing a connection control instruction for said first and second terminals to said connection control server when there is no connection state data of said second terminal in said storage server or said second terminal in a free state.

3. The computer-readable storage medium according to claim 2, wherein said method further comprises:
   said application server controlling said connection control server to call said first and second terminals in response to the connection state data indicating that said second terminal is in the free state, and said connection state data is received from said storage server.

4. The computer-readable storage medium according to claim 3, wherein said method further comprises said application server receiving the call request from said connection control server;
said application server requesting the connection state data between said first and second terminals to said storage server based on the received call request;
said application server requesting a connection state data of a substitution destination terminal when the connection state data of said second terminal indicates that said second terminal is in the busy state; and
said application server controlling said connection control server to connect said first terminal and said substitution destination terminal.

5. A computer-readable storage medium for realizing a method of controlling a connection between terminals, wherein said method comprises:
   a connection control server storing a connection state data in a storage server each time a connection state between terminals is changed;
   said connection control server receiving from a first terminal a call request for a communication with a second terminal and said connection control server notifying the call request to an application server which executes at least an application program; and
   said connection control server performing a connection control between said first and second terminals in response to a connection control instruction from said application server.

6. The computer-readable storage medium according to claim 5, wherein the call request contains a source identifier of said first terminal and a destination identifier of a second terminal.

7. The computer-readable storage medium according to claim 6, wherein the connection control data includes a data indicating a session establishment state between said first and second terminals.

8. The computer-readable storage medium according to claim 5, wherein said method further comprises:
   said connection control server issuing a busy notice to said first terminal when the connection state data indicates that said second terminal is in a busy state, so that said first terminal is disconnected.

9. The computer-readable storage medium according to claim 8, wherein said method further comprises:
   said connection control server receiving a call request from said first terminal, to notify the call request to said application server; and
   said connection control server connecting said first terminal and a substitution destination terminal for said second terminal, when said second terminal is in a busy state.

10. A connection control system comprising:
    a storage server in which connection state data are stored;
    a connection control server configured to receive from a first terminal, a call request for a communication with a second terminal, to notify the call request, to perform a connection control between said first and second terminals in response to a connection control instruction, and to store the connection state data indicating a connection state between said first and second terminals in said storage server when the connection state is changed; and
    an application server configured to receive the call request from said connection control server, to request the connection state data between said first and second terminals to said storage server based on the received call request, and to issue the connection control instruction for said first and second terminals to said connection control server.

11. The connection control system according to claim 10, wherein said connection control server stores the connection state data between said first and second terminals in said storage server when the connection state between said first and second terminals is changed.

12. The connection control system according to claim 10, wherein the connection control data includes a data indicating a session establishment state between said first and second terminals.

13. The connection control system according to claim 10, wherein said connection control server issues a busy notice to said first terminal when the connection state data indicates that said second terminal is in a busy state, so that said first terminal is disconnected.

14. The connection control system according to claim 13, wherein said connection control server stores the connection state data indicating that said second terminal is in a free state, in said storage server, said storage server supplies the connection state data indicating that said second terminal is in the free state to said application server, and said application server controls said connection control server to call said first and second terminals in response to the connection state data indicating that said second terminal is in the free state.

15. The connection control system according to claim 10, wherein said connection control server receives a call request from said first terminal, notify the call request to said application server, said application server receives the call request from said connection control server, requests the connection state data between said first and second terminals to said storage server based on the received call request, and requests a connection state data of a substitution destination terminal when the connection state data of said second terminal indicates that said second terminal is in the busy state, and said application server controls said connection control server to connect said first terminal and said substitution destination terminal.

16. An application server which executes at least an application program for connecting first and second terminals, and is connected to a storage server, comprising:

a requesting section configured to request a connection state data of said second terminal to said storage server in response to a call request for a communication with said second terminal from said first terminal;

an instructing section configured to issue a connection control instruction for said first and second terminals when there is no connection state data of said second terminal in said storage server or said second terminal in a free state.

17. The application server according to claim 16, wherein said instructing section issues a control instruction to call said first and second terminals in response to the connection state data indicating that said second terminal is in the free state, and received from said storage server.

18. The application server according to claim 17, wherein said requesting section requests the connection state data of said second terminal to said storage server based on the call request, and requests a connection state data of a substitution destination terminal for said second terminal when the connection state data of said second terminal indicates that said second terminal is in the busy state, and said instructing section issues a connection control instruction to connect said first terminal and said substitution destination terminal.

19. A connection control server which connects first and second terminals, which is connected to a storage server, comprising:

a storing section configured to store a connection state data in a storage server each time a connection state between terminals is changed;

a notifying section configured to notify a call request in response to reception of the call request for a communication with a second terminal from a first terminal; and a control section configured to perform a connection control between said first and second terminals in response to a received connection control instruction.

20. The connection control server according to claim 19, further comprising:

a message section configured to issue a busy notice to said first terminal when the connection state data indicates that said second terminal is in a busy state, so that said first terminal is disconnected.

21. The connection control server according to claim 20, wherein said control section connects said first terminal and a substitution destination terminal for said second terminal, when said second terminal is in a busy state.

* * * * *